M. S. ROOT.
Grain Drill.
No. 21,850.
Patented Oct. 19, 1858.
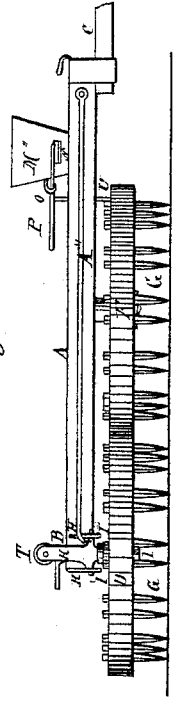
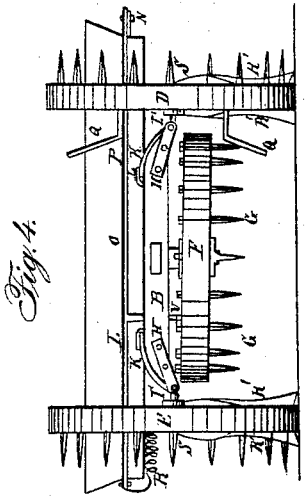
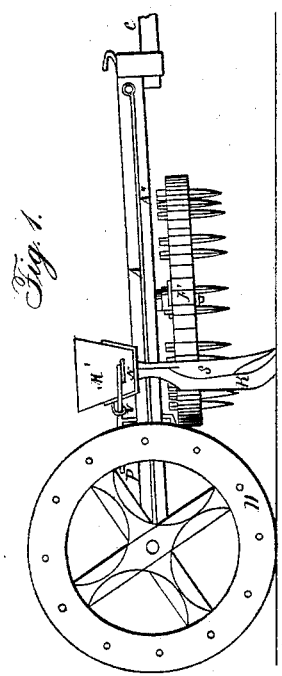
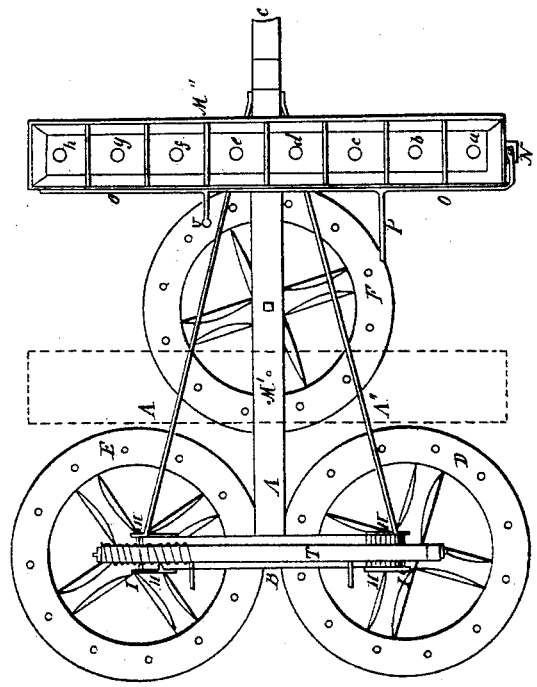

UNITED STATES PATENT OFFICE.

M. S. ROOT, OF MEDINA, OHIO.

IMPROVEMENT IN SEEDING-MACHINES.

Specification forming part of Letters Patent No. 21,850, dated October 19, 1858.

*To all whom it may concern:*

Be it known that I, M. S. ROOT, of Medina, in the county of Medina and State of Ohio, have invented certain new and useful Improvements in Combined Revolving Harrows and Seeding-Machines; and I do hereby declare the following to be a full and exact description thereof, reference being had to the accompanying drawings, in which—

Figure 1 is a side elevation of the machine when used as a corn-planter; Fig. 2, a side elevation of the machine when used as a broadcast-sower; Fig. 3, a top view of the machine as seen in Fig. 2, and Fig. 4 a rear view of Fig. 1.

Like letters refer to like parts in the different views.

The frame of this machine consists of the timber A and axle-tree B. The piece A is framed into the middle of the axle-tree and secured by a pin or otherwise. The outer ends of the axle-tree are braced by the rods A' A'', which are secured to the ends of the axle-tree and the forward end of the piece A. The neap C is attached to the forward end of the timber A.

There are three circular harrows, D E F. These consists of arms and rim, into which are inserted the teeth G. The wheels D E are hinged to the axle-tree by a hinge formed by means of a pin projecting from each side of the axle I and passing through the outer ends of the pieces H at I', which are bolted to each side of the axle-tree B. The shank of the axle K is curved to fit the upper side of the axle-tree, as seen in Fig. 4, and when the circular harrows D E are in the position seen in Figs. 1 and 4 the shanks of the axles are secured by the clasps L. The wheels or harrows D E form a truck which supports the machine when it is used in the form of a corn-planter. In this case the neap C is used to guide the machine, and the harrow F is carried above the ground and performs no office.

The seed-box M (a top view of which is seen in Fig. 3) is an oblong box, made of boards, and having a capacity of about two or three bushels. It is divided into compartments, as seen at *a b c d e f g h* in Fig. 3. At the bottom of each of these there is an orifice, which is closed by a slider, N, running the whole length of the seed-box. This slider has openings in it corresponding to those in the several sections of the seed-box, and by a proper movement of this slider, by means hereinafter to be described, the orifices are opened and closed at pleasure. A rod, O, is attached to each end of the slider M, and runs the whole length of the box upon the outside. There is an arm, P, extending horizontally from this rod and backward, against which a bent arm, Q, which is inserted into the wheel D, acts as an inclined plane against the arm P as the wheel revolves upon the ground. This action of the bent arm Q against the arm P opens the slider or valve N at regular intervals, the intervals being such as to sow the seeds at the required distances apart. The opening of the valve N allows seed to escape through the orifices in the bottom of the seed-box at *b g*.

In order to close the orifices through which the seeds pass, I introduce a coiled spring, R, which, by its elasticity, moves back the slider N the moment it is relieved from the pressure of the bent arm Q. In planting corn I use the hollow tooth placed beneath the seed-box, as seen at S in Figs. 1 and 4, two of them being used on one machine. They are attached to the seed-box immediately below a section of the seed-box, as at *b g*. These teeth have wings R' (Figs. 1 and 4) placed just behind the hollow tooth for the purpose of covering the grain after it has been dropped. For a drill the seed-box should be placed upon the frame A in the position seen in Fig. 1, and indicated in Fig. 3 by dots at M'.

When the machine is to be used for a broadcast-sower the teeth S and wings R' are removed and the seeding-box placed forward, as seen at M'', Figs. 2 and 3. The revolving harrows D and E, when the machine is used for broadcast-sowing, are turned horizontally, as seen in Figs. 2 and 3. In this case the shank of the axles points upward, as seen in Fig. 2 at K.

A rod, T, Figs. 2 and 3, having a gudgeon upon each end, passes through a hole in the end of the shank, and carries the axle a little beyond a vertical position and causes the outer edges of the harrow to press hardest upon the ground, and this causes them to rotate. The harrow F is caused to rotate by inclining the axle a little to the right or left, so that one side of the harrow will press more closely to the ground than the other.

In the use of my combined machine as a broadcast-sower the slider N is moved at short intervals by means of an arm, U, which projects from the rod O downward, and is moved by the heads of the teeth in the harrow F coming into contact with it as the harrow revolves. In this case the seeds to be sown are put into each division in the seed-box. Hence the seed is scattered upon the ground in a continuous manner, and is covered by the action of the revolving harrows.

When it is desirable to pass from place to place all that is required is to change the form of the machine into that represented in Fig. 1.

What I claim as my invention, and desire to secure by Letters Patent, is—

The bent arms Q Q, arms P and U, rod O, and spring R, when these several parts are arranged, as described, for operating the corn-planter and sower, and combined with the revolving harrow, as set forth.

MARSHALL S. ROOT.

Witnesses:
W. H. BURRIDGE,
C. H. HILL.